Patented Feb. 3, 1931

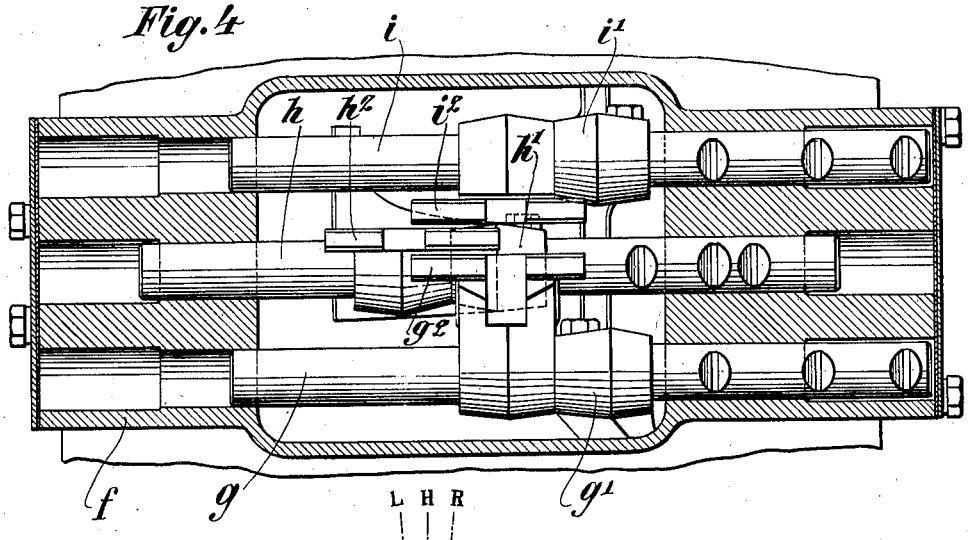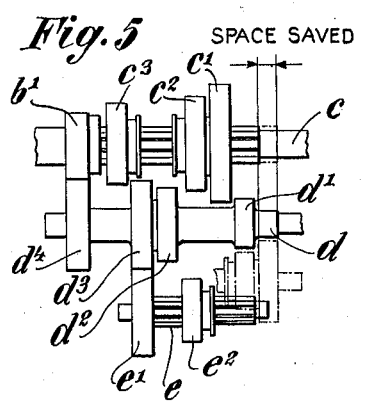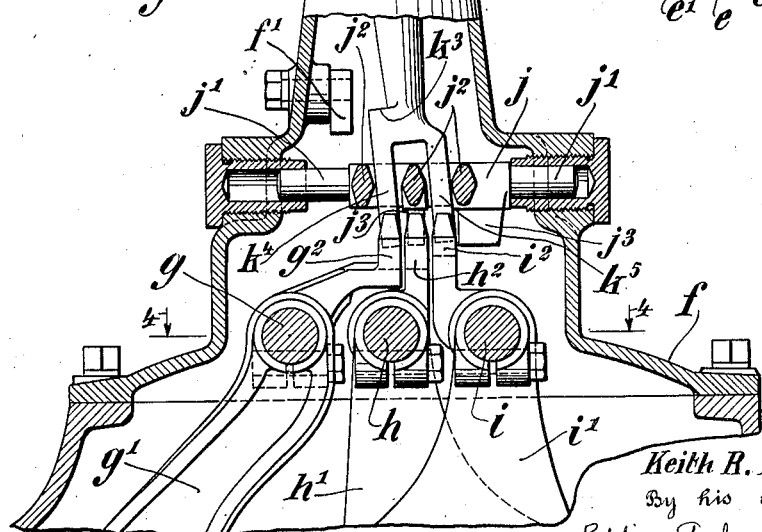

1,791,137

UNITED STATES PATENT OFFICE

KEITH R. MANVILLE, OF HIGHLAND PARK, NEW JERSEY, ASSIGNOR TO INTERNATIONAL MOTOR COMPANY, OF NEW YORK, N. Y., A CORPORATION OF DELAWARE

GEAR TRANSMISSION

Application filed May 9, 1929. Serial No. 361,592.

The present invention relates to change speed mechanisms and controlling devices therefor, and embodies, more specifically, an improved transmission, wherein the length and weight of the shafts thereof are reduced and the transmission mechanism rendered more compact.

In the usual form of change speed mechanism having forward and reverse speeds, the reverse countershaft must, of necessity, be sufficiently long to enable the reverse gear to clear the sliding gears which effect the low speed driving connections when the mechanism is operating under forward speeds. It is well known that the sliding gear for effecting a low speed driving connection meshes both with the countershaft gear corresponding to such driving connection and one of the sliding gears for effecting a reverse driving connection. In order that the sliding low speed gear will not simultaneously mesh with the countershaft gear and the reverse gear (which also meshes with the countershaft gear) the reverse gears must normally be off-
set with respect to the first mentioned gears.
It will thus be seen that the lengths of the shafts and gear box must be increased by an amount equal to the width of the reverse gear which is required to be offset, that is, displaced longitudinally of the forward gears. This results in longer and weaker shafts with considerably more weight.

The present invention embodies a mechanism in which the necessity for the additional length and weight of the shafts is eliminated by moving the reverse gears with the forward gears in the low range, thus keeping the reverse gears out of engagement with the forward gears during such shifting.
An object of the invention is to provide a transmission which is more compact than the usual type of transmission.

A further object of the invention is to provide a transmission, the shafts of which are shorter and of lighter weight than in existing designs.

A further object of the invention is to provide a transmission, the shafts of which are stronger by reason of the shortness thereof with greater ability to transmit torque.

A further object of the invention is to afford a means for taking off power from the transmission in opposite directions of rotation.

Further objects, not specifically enumerated above, will be apparent as the invention is described in connection with the accompanying drawings, wherein:

Figure 3 is a segmental view similar to Figure 2, showing the selector lever shifted to a low speed selecting position.

Figure 4 is a view in section, taken on line 4—4 of Figure 3, and looking in the direction of the arrows.

Figure 5 is a diagrammatic view of the improved transmission showing the space saved over existing designs by the construction embodied in the present invention.

Figure 1:
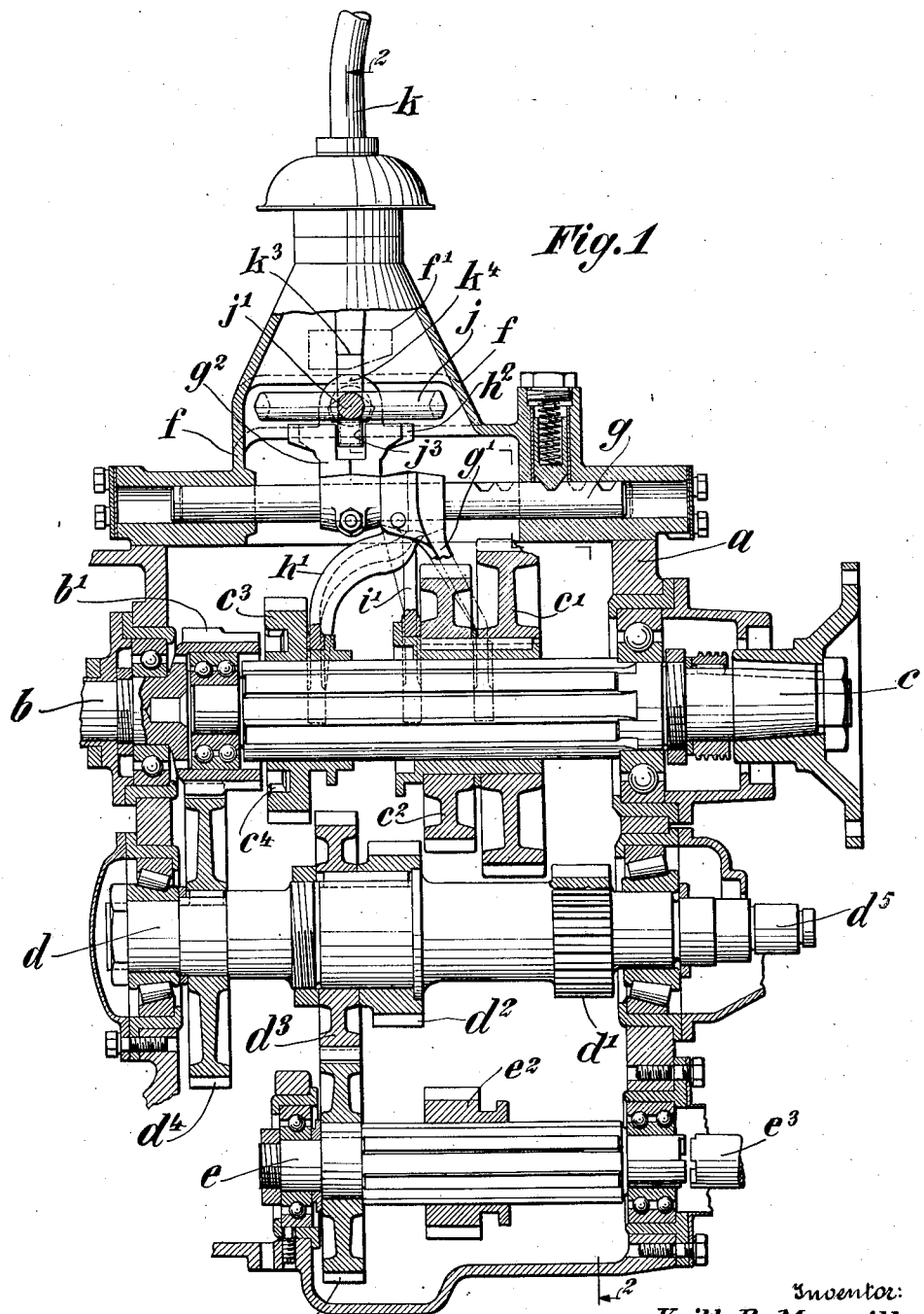
Figure 1 is a view in section, taken on line 1—1 of Figure 2, and looking in the direction of the arrows.

Referring to the above drawings, $a$ designates a transmission housing within which a driving shaft $b$ is journaled. Driven shaft $c$ delivers power to a desired mechanism and countershaft $d$ is provided with the usual fixed gears $d'$, $d^2$, and $d^3$ for affording low, second and third speeds, respectively. Reverse countershaft $e$ is provided with a fixed gear $e'$ which engages with fixed gear $d^3$ on countershaft $d$ so that the reverse countershaft $e$, as well as the countershaft $d$ rotates continuously.

A constant mesh gear $d^4$ on countershaft $d$ meshes with constant mesh driving gear $b'$ for driving the forward and reverse countershafts $d$ and $e$, respectively, and sliding gears $c'$, $c^2$ and $c^3$ afford a selective means for securing low, second, third and direct speeds. Sliding gear $c^3$ is provided with internal teeth $c^4$ for engaging the external teeth on gear $b'$, thus affording a clutch for direct drive. Sliding gear $e^2$ on the reverse counter shaft $e$ is adapted to engage gear $c'$ on driven shaft $c$ in the reverse driving positions in the usual manner.

A controlling housing $f$ carries shifter rods $g$, $h$, and $i$, shifter rod $g$ carrying the reverse shifter fork $g'$; shifter rod $h$ carrying the third and fourth speed shifter fork $h'$; and shifter rod $i$ carrying the first and second speed shifter fork $i'$. Shifter fingers $g^2$, $h^2$ and $i^2$ are formed on the respective shifter rods $g$, $h$ and $i$ to be engaged by a shifter lever as described hereinafter. The usual notch and detent mechanism is provided to lock the shifter rods in a desired position and further description of this feature is deemed unnecessary herein.

Within the control housing $f$ a guide plate $j$ is mounted. Slides $j'$ mount the guide plate in the control housing with provision for transverse movement with respect to the shifter rods described above and parallel tracks $j^2$ afford intermediate grooves within which the engaging fingers of the shifter lever ride. Downwardly extending lugs $j^3$ formed on the guide plate $j$ afford a locking means for locking those shifter fingers not engaged by the shifter lever in a predetermined shift. It will be seen that lugs $j^3$ are moved with the guide plate to engage such fingers in accordance with the selected shift.

The control housing $f$ carries a shifting lever $k$ which is mounted in a universal joint $k'$ and is adapted to be moved downwardly to effect a reverse driving connection. Spring $k^2$ normally opposes such axial movement of the shifting lever and prevents accidental shifting into reverse. A flange $f'$ is mounted in the control housing to engage a shoulder $k^3$ and thus normally prevent the engagement of the reverse shifting finger. Axial movement of the shifting lever downwardly, however, clears the flange $f'$ and permits the reverse shifting finger to be engaged.

The lower extremity of the shifting lever is provided with forked extensions $k^4$ and $k^5$. Forked extension $k^4$ engages only shifting finger $g^2$ to move the reverse sliding gear $e^2$. When extension $k^4$ engages finger $g^2$, extension $k^5$ engages finger $i^2$, thus causing the reverse shifter fork to be moved simultaneously with the first and second speed shifter fork. In this manner, gear $e^2$ is carried along with gear $c^2$ and engagement thereof is prevented in the forward speeds. This connection is shown in Figure 3.

Figure 2:
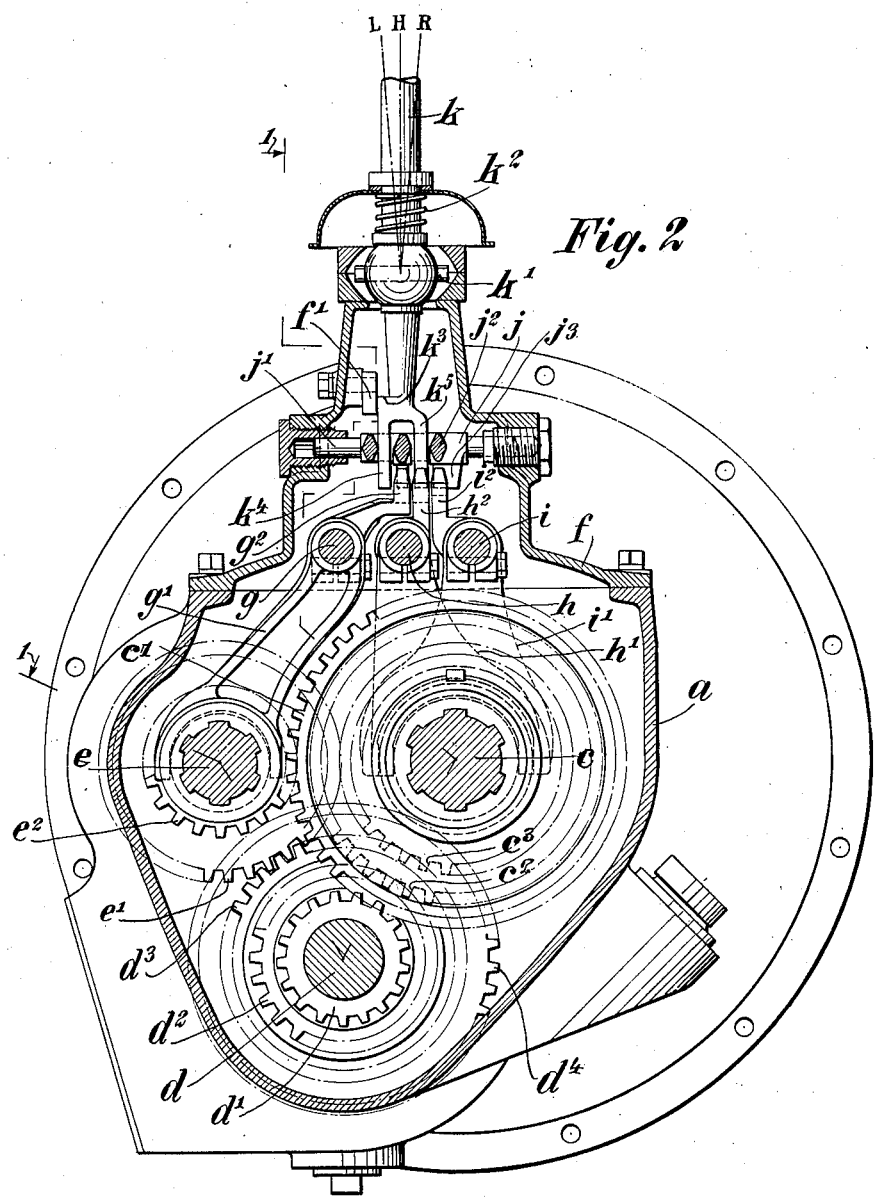
Figure 2 is a view in section, taken on line 2—2 of Figure 1, and looking in the direction of the arrows.

For securing third and fourth driving speeds, the shifting lever $k$ is moved to the position shown in Figure 2, at which time, extension $k^5$ engages shifting finger $h^2$ for moving gear $c^3$ in either direction. In this condition, the reverse shifter fork $g'$ is not moved and, together with shifter fork $i'$, is locked against movement by the lugs $j^3$.

The reverse driving connection is secured by moving the lever downwardly in the position shown in Figure 2 and shifting to the right as viewed in Figures 2 and 3. In this manner, shoulder $k^3$ clears flange $f'$, and extension $k^5$ engages shifting finger $g^2$ to enable the reverse drive to be effected. Guide plate $j$ moving with the extensions $k^4$ and $k^5$, cause the remaining shifter forks $h'$ and $i'$ to be locked against movement since the right hand lug $j^3$ engages the shifter fingers carried by each.

A power take-off $d^5$ is provided from the countershaft $d$, while a second power take-off $e^3$ is provided from the reverse countershaft $e$. In this manner, a power take-off rotating in either direction is provided and the transmission rendered quite useful in connection with special bodies where auxiliary driving mechanism is used.

Figure 5 illustrates the space saved over old and existing forms of transmissions by the construction described herein and it will be seen that modifications in the design and arrangement of parts may be made to suit individual installations. The transmission shown and described herein has been found to be highly successful and embodies a distinct improvement over existing designs.

I claim as my invention:

1. A change speed mechanism including shiftable forward and reverse gears, a shifting means, forked extensions on the shifting means, a guide plate within which the extensions slide, means for mounting the guide plate to partake of movement transverse to the axes of the gears, shifter forks for shifting the gears, means on the forks for engagement selectively by the extensions, and means on the guide plate for preventing movement of the shifter forks not so engaged.

2. A change speed mechanism including shiftable forward and reverse gears, a shifting means, forked extensions on the shifting means, a guide plate within which the extensions slide, shifter forks for shifting the gears, means on the forks for engagement selectively by the extensions, and means on the guide plate for preventing movement of the shifter forks not so engaged.

3. A change speed mechanism including shiftable forward and reverse gears, a shifting means, forked extensions on the shifting means, a guide plate within which the extensions slide, shifter forks for shifting the gears, and means on the forks for engagement selectively by the extensions.

4. A change speed mechanism including shiftable forward and reverse gears, said reverse gear being adapted to be engaged with one of the shiftable forward gears to effect a reverse driving connection, a shifting means, independent shifter forks engaged selectively by the shifting means for shifting the gears, and means on the shifting means for engaging the reverse fork simultaneously with the engagement of the forward fork of the gear with which the reverse gear cooperates to effect a reverse drive.

This specification signed this 6th day of May, A. D. 1929.

KEITH R. MANVILLE.